(12) United States Patent
Barron, Jr. et al.

(10) Patent No.: US 8,577,700 B2
(45) Date of Patent: *Nov. 5, 2013

(54) SYSTEM AND METHOD FOR PROCESSING DATA RELATED TO DEATH BENEFIT AMOUNTS FOR LIFE INSURANCE POLICIES

(75) Inventors: Edwin Clifford Barron, Jr., Suffield, CT (US); Thomas P. Kalmbach, Southwick, MA (US); Michael J. Roscoe, South Windsor, CT (US)

(73) Assignee: The Prudential Insurance Company of America, Newark, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/472,016

(22) Filed: May 15, 2012

(65) Prior Publication Data

US 2012/0226509 A1  Sep. 6, 2012

Related U.S. Application Data

(63) Continuation of application No. 12/080,976, filed on Apr. 8, 2008, now Pat. No. 8,180,656.

(60) Provisional application No. 60/922,660, filed on Apr. 9, 2007.

(51) Int. Cl.
*G06Q 40/00* (2012.01)

(52) U.S. Cl.
USPC .................................................. 705/4; 705/35

(58) Field of Classification Search
USPC ....................................................... 705/4, 35
See application file for complete search history.

(56) References Cited

U.S. PATENT DOCUMENTS

| | | | |
|---|---|---|---|
| 6,456,979 B1 | 9/2002 | Flagg | |
| 6,950,805 B2 | 9/2005 | Kavanaugh | |
| 7,343,333 B2 | 3/2008 | Menke | |
| 7,640,202 B2 | 12/2009 | Foti et al. | |
| 7,840,471 B2 | 11/2010 | Foti et al. | |
| 8,180,656 B2 | 5/2012 | Barron, Jr. et al. | |
| 2002/0174046 A1 | 11/2002 | Mistretta | |
| 2004/0236612 A1 | 11/2004 | Heusinkveld et al. | |
| 2005/0086085 A1 | 4/2005 | Berlin et al. | |
| 2006/0085338 A1 | 4/2006 | Stiff et al. | |
| 2006/0155622 A1 | 7/2006 | Laux | |
| 2008/0071584 A1 | 3/2008 | Parankirinathan | |
| 2010/0131423 A1* | 5/2010 | Meyer et al. ................ | 705/36 R |

OTHER PUBLICATIONS

Barron, Jr., et al., U.S. Appl. No. 12/080,976, Non-final Office Action from the U.S. Patent and Trademark Office, Mar. 31, 2011.

(Continued)

*Primary Examiner* — Lalita M Hamilton
(74) *Attorney, Agent, or Firm* — Baker Botts L.L.P.

(57) ABSTRACT

A computer system for processing data relating to a life insurance policy issued by an insurance company to an owner includes a data storage device storing data relating to the life insurance policy, including data indicative of a face amount, a benefit account, an investment account and a death benefit factor, and a processor configured to access data indicative of the face amount, a value of the investment account, a value of the benefit account and a value of the death benefit factor; determine a first value based on a sum of the face amount and the value of the investment account; determine a second value based on the benefit account value, the investment account value and the value of the death benefit factor; and determine an amount of a death benefit of the life insurance policy to be the greater of the first value and the second value.

21 Claims, 5 Drawing Sheets

(56) References Cited

OTHER PUBLICATIONS

Barron, Jr., et al., U.S. Appl. No. 12/080,976, Response to Non-final Office Action from the U.S. Patent and Trademark Office, Jun. 29, 2011.

Barron, Jr., et al., U.S. Appl. No. 12/080,976, Non-final Office Action from the U.S. Patent and Trademark Office, Sep. 13, 2011.

Barron, Jr., et al., U.S. Appl. No. 12/080,976, Response to Non-final Office Action from the U.S. Patent and Trademark Office, Dec. 13, 2011.

Barron, Jr., et al., U.S. Appl. No. 12/080,976, Notice of Allowance from the U.S. Patent and Trademark Office, Mar. 14, 2012.

* cited by examiner

SYSTEM AND METHOD FOR PROCESSING DATA RELATED TO DEATH BENEFIT AMOUNTS FOR LIFE INSURANCE POLICIES

CROSS-REFERENCE TO RELATED APPLICATIONS

This application is a continuation application of co-pending U.S. patent application Ser. No. 12/080,976 entitled Hybrid Life Insurance Product With An Improved Total Return, filed Apr. 8, 2008, which claims priority to Provisional Application No. 60/922,660, filed Apr. 9, 2007, the entire contents of all of which are herein incorporated by reference.

FIELD OF THE INVENTION

The present invention generally relates to the field of life insurance. More specifically, the present invention relates to the creation of an improved life insurance product. The life insurance product can be utilized to provide an increased total return to a purchaser.

BACKGROUND OF THE INVENTION

Individuals purchase life insurance products for a variety of reasons, whether to simply ensure payment of funeral services, to provide additional income to the individual's family in case of an accident, or to provide financial security to a loved one. Corporations typically purchase or sponsor life insurance products as a financing vehicle for benefit plans or to hedge against other liabilities. Consequently, there are a variety of different types of life insurance products available for purchase.

For example, single premium life insurance allows a purchaser to pay a one-time fee, or premium, to receive a fully funded life insurance policy with a predetermined value (i.e., the face value). The death benefit under such a policy depends on the individual insured, the premium paid, and the face value of the policy. Typically, the premium payment is deposited into an interest bearing cash value account. The interest rate is compounded at specific intervals, usually annually. The interest rate may change periodically, but a single premium life insurance policy typically guarantees a minimum interest rate amount. In return, the insurance company charges a variety of fees, including an annual fee, mortality risk fee, and an administrative fee.

In addition, insurance companies typically charge a large penalty on a single premium life insurance policy if the insured withdraws money from the policy during the first few years. In addition, while the purchaser may take out a loan against the proceeds of this type of policy, interest rate charges may apply. The up-front premium usually represents a large portion of the face value of the policy.

Term life insurance provides a predetermined benefit payment to an insured/purchaser (i.e., an individual or a group purchasing the life insurance) for a specifically designated period, such as for one year, five years, ten years or fifteen years. The insurer only pays the face value if the insured (i.e., an individual or a person within the group) dies within the period in which the policy is in effect. However, if the insured lives longer than the term of the policy, the policy expires and pays nothing. Consequently, term life insurance does not build any equity. The principal advantage of term life insurance is that it is relatively inexpensive. Because of its speculative nature, term life insurance may be purchased as a means of temporary protection or when an individual cannot afford the cost of other forms of life insurance.

Other alternatives are renewable and non-renewable term life policies. With renewable term life insurance, a purchaser automatically re-qualifies and is able to continue the existing policy when the original term is up. A non-renewable policy simply indicates that when the policy expires, the individual must take another physical and answer more health questions in order to re-qualify for a new policy.

Insurers offer riders (i.e., provisions in the insurance policy allowing for amendments to its terms and/or coverage) in order to improve the return characteristics. For example, many term life insurance policies are convertible. Convertible term life policies allow the insured to exchange the term policy into a permanent form of life insurance. However, the costs associated with the conversion are high, lowering the return of this type of insurance policy.

Yet another type of insurance is whole life insurance, which provides coverage throughout the entire life of the insured. In this type of insurance, premiums are paid throughout the insured's life or for a portion thereof (e.g., for 10 years or 20 years). Further, the cash value portion of a whole life insurance policy belongs to the insured and may be withdrawn as a loan, however, any loans and interest charges accrued on the loans not paid back to the insurer reduce the death benefit payable to the insured. Alternatively, a whole life insurance policy may be surrendered for a predetermined percentage of its face value. Premiums paid into a whole life insurance policy are allocated between the insurance portion of the policy and the investment or cash portion of the policy. The investment portion of the policy usually consists of stocks, bonds and/or mutual funds.

Universal Life insurance is a variation of whole life insurance. Universal life insurance separates the term life portion of the policy from the investment, or cash portion, of the policy. In addition, the investment portion of the policy is invested in money market funds as opposed to stocks, bonds and mutual funds. The cash value portion of the policy is held in an accumulation account that investment interest is credited to and death benefits are paid from. Consequently, the insured can vary the amount of the annual death benefit because it is contingent upon the underlying variable investments.

There are two general types of universal life insurance. The first type provides a set death benefit for the insured regardless of premiums paid which keeps the policy in force. The second type sets the death benefit for the insured equal to a set amount plus the current cash value of the policy at the time of the insured's death.

Variable life insurance is also a form of whole life insurance. As with other insurance policies, part of the premium payment goes toward the term life portion of the policy, part to administrative expenses and part to the investment or cash value portion of the policy. The principal difference between variable life insurance and other types of insurance is that the insured is able to actively choose how to invest the funds in the investment portion of the policy. For example, the insured may select from an array of investments such as stocks, bonds and mutual funds as long as they are within the insurance companies portfolio. In variable life insurance, death benefits may fluctuate up or down depending upon investment performance.

In universal life insurance and variable life insurance policies, premiums are flexible and the internal rate of return may be higher because it moves with the financial markets. In addition, mortality costs and administrative charges are known.

However, both universal life and variable life insurances have similar disadvantages, which stem primarily from their flexibility. Cash values are not guaranteed and benefit payments can vary wildly because these policies lack the fundamental guarantee that the policy will be in force unless sufficient premiums have been paid. In other words, these types of insurance policies lapse unless the purchaser has paid a sufficient amount of premium payments to cover both the variable and fixed expenses of the product.

Because there are no life insurance products which have a high internal rate of return and a guarantee that the life insurance policy will not lapse, there is a clear need in the art for a life insurance product which incorporates both of these features.

SUMMARY OF THE INVENTION

The present invention overcomes the various deficiencies associated with this shortcoming by creating a novel life insurance product that provides the purchaser with a sufficiently high rate of return and a guarantee that the product will not lapse by incorporating a policy protection benefit into the life insurance product.

The present invention provides a hybrid life insurance product that overcomes some of the drawbacks and limitations of previous inventions. The present invention comprises a novel life insurance product with an improved total return. The life insurance product comprises a face value, and account value, a minimum death benefit amount, and an automatic policy protection benefit. In addition, the life insurance product can contain optional riders and/or a plurality of settlement options.

The face value is the initial death benefit payable to a purchaser. The value is determined by the purchaser and requires the payment of a premium amount. The face value of the product can be reduced by agreement, by taking out a loan against the product, by making a withdrawal from the benefit account of the insurance policy, or any other manner as is known in the art.

The account value comprises two primary components, a benefit account and a variable investment account. The variable investment account is comprised of a fixed account, which offers a guaranteed rate of return, and a plurality of variable sub-accounts with a fluctuating rate of return.

The benefit account, which can be part of a general account, offers a fixed rate of return. As described in greater detail below, charges relating to benefits of the life insurance product are deducted from this account, and net premiums that are designated to preserve the product are allocated to this account.

In accordance with the present invention, the life insurance product contains a policy protection benefit, which is designed to prevent the product from going into default. More specifically, when this benefit is available, normal periodic deductions from the benefit account are waived to the extent that the deductions would exceed the benefit account value.

This is in stark contrast to current insurance products. Currently, variable life insurance policies automatically lapse (i.e., default) if the periodic deductions exceed the account value. As a result, a purchaser would lose all of the value associated with the variable life insurance policy.

The policy protection benefit of the current invention is automatically available if the policy protection test is met. In addition, it is contemplated that the purchaser could pay additional premiums to the benefit account or transfer funds from the variable investment account.

To determine if the policy protection test is met, the current invention utilizes a policy protection account. This account is a reference account used solely to determine whether the policy protection test has been met. In other words, it is not utilized to determine the actual account value or death benefit.

The offeror of the present invention can provide periodic updates to the purchaser regarding the status (i.e. availability) of the policy protection benefit, and what steps, if any, are needed to activate the benefit.

The present invention may also comprise a minimum death benefit. In the preferred embodiment, the minimum death benefit is the greater of the face amount of the policy plus the value of the variable investment account or a predetermined percentage of the account value. While any percentage can be utilized in accordance with the present invention, in the preferred embodiment the range is between 100% and 1400% inclusively.

It is also contemplated that the present invention can further comprise one or more optional riders. In the preferred embodiment, the present invention utilizes one or more of the following riders, which are discussed in greater detail below: an estate tax repeal benefit rider, an accidental death benefit rider, a waiver of specified amount disability benefit rider, a waiver of the monthly deduction rider, a cost of living adjustment rider, a policy continuation rider, a child rider, and an accelerated benefit rider. Of course, any other rider can be utilized in combination with the present invention.

The life insurance product of the present invention also allows a purchaser to choose one or more settlement options once payment is due. In the preferred embodiment of the present invention, the settlement options available include a lump sum, interest income, payments of a fixed value, and payments for a fixed period of time.

The aforementioned features provide the present invention with a variety of flexible features. For example, planned premiums are not required to be paid because the policy protection benefit insulates a purchaser from a potential lapse of the product. It is contemplated that premiums can be increased, decreased, stopped, or resumed. Further, the death benefit can be increased or decreased at the option of the purchaser.

Also, disclosed is a method for providing a life insurance product with an improved rate of return. Initially, a life insurance product is constructed in a manner as disclosed above and is offered for sale to a purchaser.

The purchaser chooses a face value for the policy in accordance with his desired level of risk, along with any optional riders that the purchaser wishes to include in the life insurance product.

A premium payment is calculated based on the purchaser's customization of the product. The purchaser then provides the premium payment and allocates it between the benefit account and the variable investment account.

Accordingly, an object of the present invention is to provide an improved life insurance product.

Still another object of the present invention is to provide a life insurance product with an improved rate of return.

Another object of the present invention is to utilize a policy protection benefit to prevent the policy form going into default.

Still another object of the present invention is the creation of a life insurance product that has a benefit account and a variable investment account.

Yet another object of the present invention is to utilize a policy protection test to determine if a policy protection benefit is available to a purchaser.

Another object of the present invention is to offer an improved life insurance product for sale to a purchaser.

Other objects, features, and characteristics of the present invention, as well as the methods of operation and functions of the related elements of the structure, and the combination of parts and economies of manufacture, will become more apparent upon consideration of the detailed description below, all of which form a part of this specification.

BRIEF DESCRIPTION OF THE DRAWINGS

A further understanding of the present invention can be obtained by reference to a preferred embodiment set forth in the illustrations of the accompanying drawings. Although the illustrated embodiment is merely exemplary of systems for carrying out the present invention, both the organization and method of operation of the invention, in general, together with further objectives and advantages thereof, may be more easily understood by reference to the drawings and the following description. The drawings are not intended to limit the scope of this invention, which is set forth with particularity in the claims as appended or as subsequently amended, but merely to clarify and exemplify the invention.

DETAILED DESCRIPTION OF THE PREFERRED EMBODIMENT

A detailed illustrative embodiment of the present invention is disclosed herein. However, techniques, systems and operating structures in accordance with the present invention may be embodied in a wide variety of forms and modes, some of which may be quite different from those in the disclosed embodiment. Consequently, the specific structural and functional details disclosed herein are merely representative, yet in that regard, they are deemed to afford the best embodiment for purposes of disclosure and to provide a basis for the claims herein which define the scope of the present invention.

Moreover, well known methods, procedures, and substances for both carrying out the objectives of the present invention and illustrating the preferred embodiment are incorporated herein but have not been described in detail as not to unnecessarily obscure novel aspects of the present invention.

None of the terms used herein, including "product", "life insurance policy", "policy", "life insurance", and "life insurance product" are meant to limit the application of the invention. The terms are used interchangeably for convenience and are not intended to limit the scope of the invention. Similarly, the use of the term "company", "individual", "purchaser", and "corporation" is not meant to limit the scope of the invention to one type of entity or group, as any entity, individual, or group can also utilize the present invention. The following presents a detailed description of a preferred embodiment of the present invention.

Figure 1:
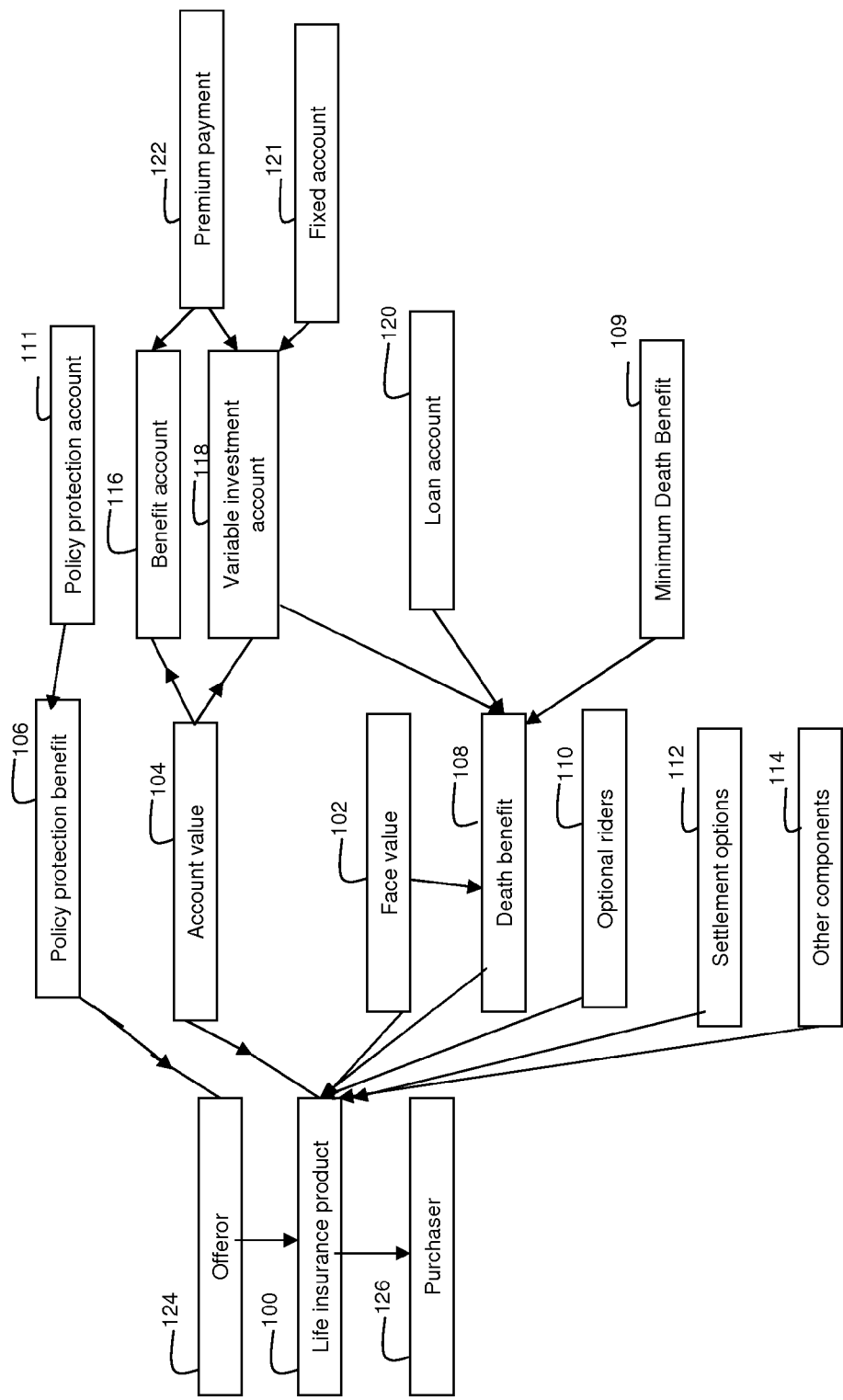
FIG. 1 is a structure of the life insurance product in accordance with the preferred embodiment of the invention.

Referring now to the diagrams, FIG. 1 shows the structure of a hybrid life insurance product 100 made in accordance to the teachings of the preferred embodiment. Particularly, the hybrid life insurance product 100 of the present invention further comprises a face value or amount 102, an account value 104, a policy protection benefit 106, and a death benefit 108. The death benefit 108 may have a minimum value known as the minimum death benefit 109.

In addition, the hybrid life insurance product 100 of the present invention may comprise, in one non-limiting embodiment, optional riders 110, and one or more settlement options 112. It should be appreciated that the life insurance product 100 is not limited to the features disclosed and any other components 114 or riders 110 known in the art to be combinable with insurance products may be utilized in accordance with alternate embodiments of the present invention.

Yet further, and as shown in FIG. 1, the account value 104 comprises a benefit account 116, a variable investment account 118, and a loan account 120. The premium payment 122 received for the life insurance product 100 is initially allocated at least in part between the benefit account 116 and the variable investment account 118. It should also be appreciated that the life insurance product 100 of the present invention is provided by an offeror 124 to a purchaser 126, and the purchaser 126, in other non-limiting embodiments, may be an individual, a group, or a third-party concern (such as an investor owned insurer)

Yet further, the face value 102 represents the amount utilized by the life insurance product 100 to determine the death benefit 108. In the preferred embodiment, the face value 102 is the initial value of the life insurance product 100 of the present invention.

Also, the face value 102 may be increased or decreased only by agreement between the offeror 124 and purchaser 126 of the life insurance product 100. As an example, the face value 102 of the life insurance product 100 may be increased by the purchase of at least one of the optional riders 110, such as in one non-limiting example, a cost of living adjustment rider (i.e., an adjustment made to the death benefit 108 in order to counteract the effects of inflation). Conversely, in accordance with the present invention, the face value 102 may be decreased by the purchaser 126. In the preferred embodiment, the face value 102 may be decreased at any time after one year from the date of purchase of the life insurance product 100 without a fee. Further, in the preferred embodiment a decrease in the face value 102 of the life insurance product 100 does not change any of the other product features (e.g., policy rates and charges). Preferably, a request for a decrease in the face value 102 is made in writing and will take effect on the next monthly activity date.

The face value 102 of the present invention may be determined in any number of ways as is known in the art. For example, the face value 102 may be an arbitrary amount selected by a purchaser 126, which is associated with an initial premium payment 122 amount. Alternatively, the purchaser 126 may select, from a range, the initial premium payment 122 amount that the purchaser 126 is willing to pay. This initial premium payment 122 amount is then utilized to determine a corresponding face value 102. In one non-limiting embodiment, the premium payment 122 amount and the face value 102 are determined by a computer system or program which will be discussed below.

As previously mentioned, the life insurance product 100, in one-non-limiting embodiment, may comprise other optional riders 110, such as but not limited to an estate benefit rider, an accidental death benefit rider, a waiver of specified amount disability benefit rider, a waiver of the monthly deduction rider, a cost of living adjustment rider, a policy continuation rider, a child rider, an accelerated benefit rider, Modified Surrender Value Endorsement, Guaranteed Withdrawal Benefit, Lifetime Income Benefit and any other riders or guarantees known in the art. Such optional riders 110 are well known in the art.

In the preferred embodiment and best shown in FIG. 1, the death benefit 108 is equal to the greater of the sum of the face value 102, the value in the variable investment account 118, and the value of the loan account 120 attributable to loans taken from the investment account 118, or the value of the minimum death benefit 109.

In the preferred embodiment, the value of the minimum death benefit 109 is the account value 104 multiplied by a predetermined percentage. It should be appreciated that while any predetermined percentage or multipliers may be utilized in accordance with the present invention, in the preferred embodiment this range is between 100% and 1400%, inclusively, and this percentage may not be less than what is required by regulations. The following example clarifies the difference between the death benefit 108 and the minimum value of the death benefit 109.

TABLE 1

EXAMPLE OF DEATH BENEFIT CALCULATION

| PARAMETER | Example A | Example B |
| --- | --- | --- |
| Face Amount | $50,000 | $50,000 |
| Benefit Account Value | $ 5,000 | $ 5,000 |
| Investment Account Value | $23,000 | $10,000 |
| Loan Account | 0 | $30,000 |
| Total Account Value | 28,000 | 45,000 |
| Specified Percentage | 250% | 250% |

As shown in Table 1, Example A shows the total of the death benefit 108 is $73,000 equal to the Face Amount 102 plus the value in the Variable Investment Account 118, which is greater than the minimum value of the death benefit 109 of $70,000 (i.e., the greater of the face value 102 plus the investment account 118 or 250% of the account value 104). Thus, in Example A, the death benefit 108 disbursed would be $73,000. In Example B as shown in Table 1, the total of the death benefit 108 is $60,000 equal to the Face Amount 102 plus the value in the Investment Account 118 which is less than the minimum value of the death benefit 109 of $112,500 (the greater of the face value 102 plus the investment account 118 or 250% of the account value 104). Thus, in Example B the death benefit 108 disbursed would be $112,500.

Also as shown in FIG. 1, the initial premium payment 122 is allocated to account value 104. In addition, the life insurance product 100 of the present invention provides for any subsequent premium payment 122 which may also be allocated to the account value 104. In the preferred embodiment of the present invention, tax charges and premium charges are deducted from the premium payment 122 before it is allocated to the account value 104.

In the preferred embodiment of the present invention as described in greater detail below, the account value 104 is equal to the sum of the accumulated value in the benefit account 116, the variable investment account 118, and the loan account 120.

In the preferred embodiment, the accumulated value of the benefit account 116 is equal to the net of the each of the premium payments 122 allocated to it, plus the net amount transferred into it from other investment choices (i.e., the loan account 120 or the variable investment account 118), plus any interest credited to the account value 104. Deductions to this account value 104 include transfers out of the benefit account 116 (and any associated transfer fee), any monthly charges of the life insurance product 100, and withdrawals made by the purchaser 126. It is contemplated that any other known method of valuing a benefit account 116 can be utilized in accordance with the present invention. As a non-limiting example, the entire value of benefit account 116 may be determined and maintained through the use of a computer system, software, and/or a database.

The variable investment account 118 may comprise a plurality of sub-accounts. For example, the investment account 118 could comprise two investment choices whose sum is equal to the variable investment account 118. One such choice could be a fixed account 121.

The fixed account 121 is an account that guarantees a predetermined rate of return (i.e., 3%). In the preferred embodiment, the accumulated value of the fixed account 121 portion of the variable investment account 118 is equal to the net of premium payments 122 that are allocated to it plus the net amount transferred into it from other investment choices (i.e., the loan account 120, the benefit account 116, etc.), plus any interest credited to the fixed account 121. Deductions to this account include transfers out of the fixed account 121 (and any associated transfer fee), monthly charges of the life insurance product 100, withdrawals made by the purchaser 126, and any applicable surrender chargers. It is contemplated that any other known method of valuing a fixed account 121 can be utilized in accordance with the present invention. For example, the entire fixed account 121 can be determined and maintained through the use of a computer system, software, and/or a database.

In addition, the present invention allows a purchaser 126 to transfer amounts residing in the individual benefit account 116 and variable investment account 118 (i.e., transfer funds between the benefit account 116 and the variable investment account 118 portions of the account), although the life insurance product 100 of the present invention may impose a series of standard charges on the insured, such as premium charges, premium fees, cost of insurance charges, administrative charges, and mortality and expense risk charges. These charges are well known in the art. Due to the unique structure of the present invention, Table 2 summarizes the accounts in which standard charges are imposed as a result of such transfers.

TABLE 2

CHARGES INCURRED

| CHARGE | DEDUCTED FROM | DEDUCTED WHEN |
| --- | --- | --- |
| Premium Charge | Premium payments allocated to benefit account and values transferred from the variable investment account to the benefit account | When premium payments or transfers are made |
| Premium Tax Fee | Premium payments | When premium payments are made |
| Benefit Account Cost of Insurance | Benefit account | Monthly, as part of the benefit account deduction amount |
| Investment Account Cost of Insurance | Investment account | Monthly, as part of the variable investment account deduction amount |

TABLE 2-continued

CHARGES INCURRED

| CHARGE | DEDUCTED FROM | DEDUCTED WHEN |
|---|---|---|
| Monthly Administrative Charge | Benefit account | Monthly, as part of the benefit account deduction amount |
| Monthly Per $1,000 Charge | Benefit account | Monthly, as part of the benefit account deduction amount |
| Mortality and Expense Risk Charge | Investment account | Monthly, as part of the variable investment account deduction amount |

As can be seen from the above Table 2, the monthly deductions from the benefit account 116 comprises a monthly benefit account cost of insurance charge, a monthly administrative charge, and a monthly per $1,000 charge. In addition, a monthly fee for any optional riders 110 is deducted from the benefit account 116. A monthly charge for the variable investment account 118 comprises a variable investment account cost of insurance charge and a mortality and expense risk charge.

In addition, the life insurance product 100 of the present invention allows a purchaser 126 to make withdrawals. Preferably, the number of withdrawals is limited to one withdrawal per month. When a withdrawal is made from the variable investment account 118, an investment account withdrawal charge is assessed, however, the face amount 102 is not reduced and the policy protection benefit account 106 is not affected, and which will be discussed in detail below. It should be appreciated that the policy protection account 106 may be representative of the basis of the life insurance product 100, and can be used to offset losses in the variable investment account 118. However, if a purchaser 126 chooses to withdraw funds from the benefit account 116, the face value 102 of the life insurance product 100 is reduced accordingly. For example, a $1,000 withdrawal from the benefit account 116 will reduce the face value 102 of the life insurance product 100 by $1,000.

As was mentioned earlier, if a withdrawal is made from the variable investment account 118, unless otherwise specified, the investment account 118 is reduced on a pro rata basis. In one non-limiting embodiment, the fee for withdrawing funds from the variable investment account 118 is a function of the duration of time in which a particular premium payment 122 has been invested. In addition, a withdrawal from the investment account 118 does not reduce the face amount 102 and does not have an effect on the policy protection benefit account 106. As an example, Table 3 identifies possible withdrawal charges to the investment account 118 in accordance with the preferred embodiment of the life insurance product 100.

TABLE 3

WITHDRAWAL CHARGES

| Number of Years Since the Premium Allocation to the Investment Account | Fee as a Percentage of the Amount Withdrawn |
|---|---|
| 0 | 7% |
| 1 | 7% |
| 2 | 7% |
| 3 | 6% |
| 4 | 5% |
| 5 | 4% |

TABLE 3-continued

WITHDRAWAL CHARGES

| Number of Years Since the Premium Allocation to the Investment Account | Fee as a Percentage of the Amount Withdrawn |
|---|---|
| 6 | 3% |
| 7+ | 0% |

Yet further, the plurality of accounts for the life insurance product 100 may have a plurality of sub-accounts. In one non-limiting embodiment, the sub-accounts may represent shares of a variable investment vehicle, such as a mutual fund, and these mutual funds may be pre-existing, commercially available funds or specially designed funds. In accordance with the present invention, when a purchaser 126 elects to allocate a premium payment 122 to one or more sub-accounts, the account value 104 will be determined by the rate change of the variable investment(s) (such as, in one non-limiting embodiment, by mutual funds).

Furthermore, additional charges, such as transfer charges (described above), surrender charges (described below), and withdrawal charges (described below) may apply.

Figure 2:
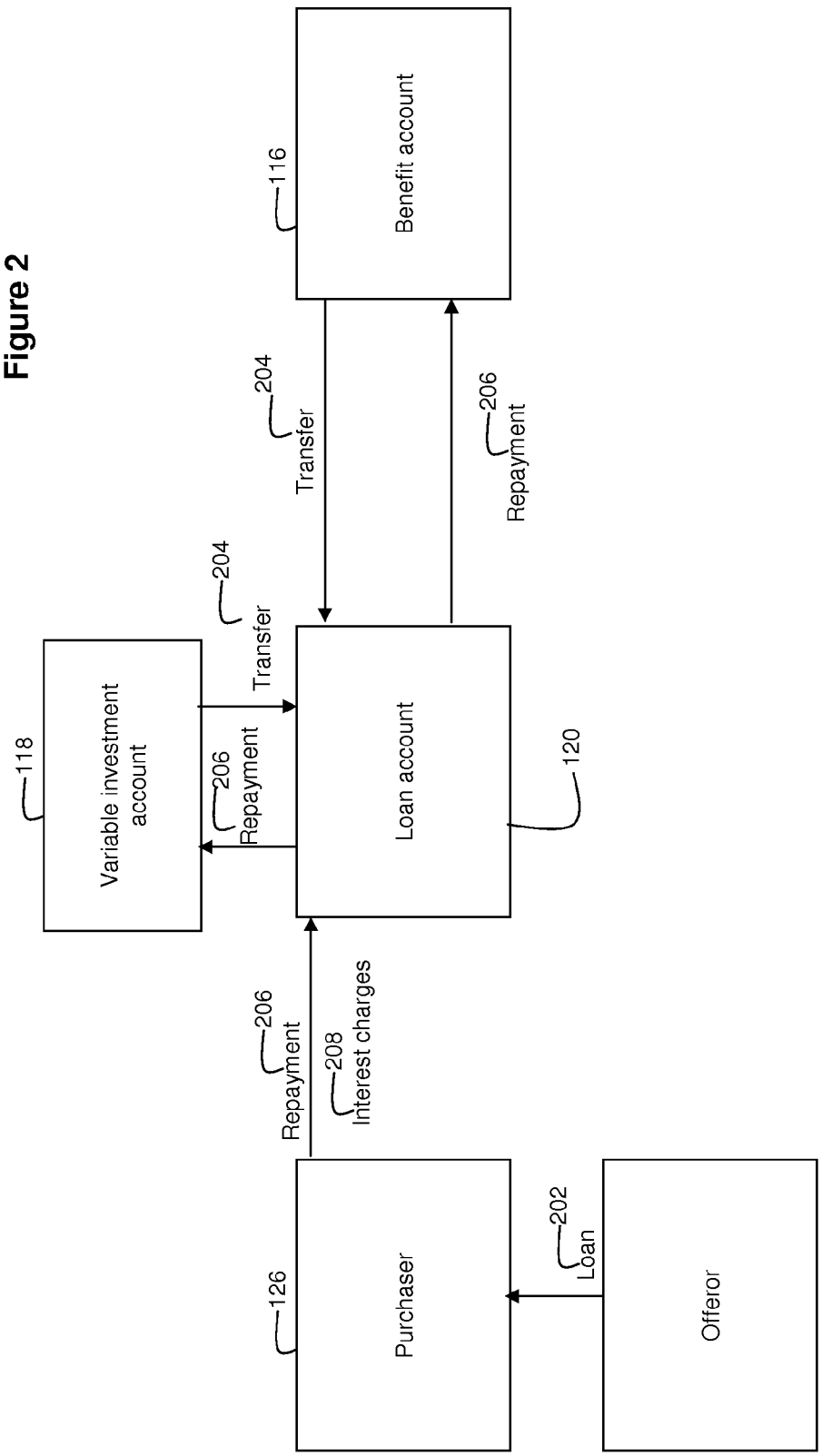
FIG. 2 is a structure of the loan account which is shown in FIG. 1 and further shows the exchange of payments related to the loan account in accordance with an embodiment of the present invention.

Also as shown in FIGS. 1-2, the life insurance product 100 of the present invention may also comprise a loan account 120 (also known as a collateral account). Moreover, FIG. 2 shows the exchange of payments related to loan account 120. A purchaser 126 may borrow a loan 202 (i.e., a monetary value) against the death benefit 108 amount of the life insurance product 100 of the present invention, and utilize the investment account 118 and the benefit account 116 as collateral (i.e., as security to the offeror 124 in case the purchaser 126 fails to pay back the loan 202). When a purchaser 126 receives a loan 202, the assets of the offeror 124 are utilized as the loan 202, and monetary amounts are transferred from the investment account 118 and benefit account 116 to the loan account 120 as collateral (i.e., security). In one non-limiting embodiment, Account Value 104 in the form of transfer 204 from either the benefit account 116 or the variable investment account 118 may be used to create the collateral (i.e., loan 202) and transferred to the loan account 120, and these transfers 204 may be transferred at the request of the purchaser 126. In addition, if transfers from the variable investment account 118 do occur, it is preferred that transfers occur on a pro rata basis. Furthermore, at death of the purchaser 126, any outstanding amounts not paid back on the loan 202 are paid off by the death benefit 108 (i.e., death benefit 108 is reduced at death by the outstanding debt).

Also, the life insurance product 100 offers various investment options, and in one non-limiting embodiment, a purchaser 126 may make a repayment 206 (i.e., pays back the debt) against any portion of the loan 202 which has not been paid back to the offeror 124. When a repayment 206 is made, the outstanding debt is reduced. When the debt is reduced, value is transferred from the loan account 120 (as less collateral is needed by the offeror 124) back to the benefit account 116 and investment account 118 as repayment 206. When a repayment 206 is made by the purchaser 126, the loan account 120 is reduced by the corresponding value of the repayment 206, and the benefit account 116 and the variable investment account 118 values are reallocated among the benefit account 116 and the variable investment account 118.

In addition, interest charges 208 may accrue on the loan 202 amount. In this case, the purchaser 126 also pays the interest charges 208 along with the repayment 206. In one non-limiting embodiment, the interest charges 208 may be within a range of 3.25% to 5%, inclusively, but in other non-limiting embodiments, interest charges 208 may range from 0% to a pre-determined amount, as determined by the offeror 124.

In addition, the preferred embodiment of the present invention utilizes differing interest charges 208 depending upon how long the life insurance product 100 of the present invention has been in force. As one non-limiting example, during the first ten years, the interest charges 208 may be set at 5%. However, after this time period, the interest charges may be reduced to 3.25%. Of course, any means of determining appropriate interest charges 208 that is known in the art can be utilized in accordance with the present invention.

Figure 3:
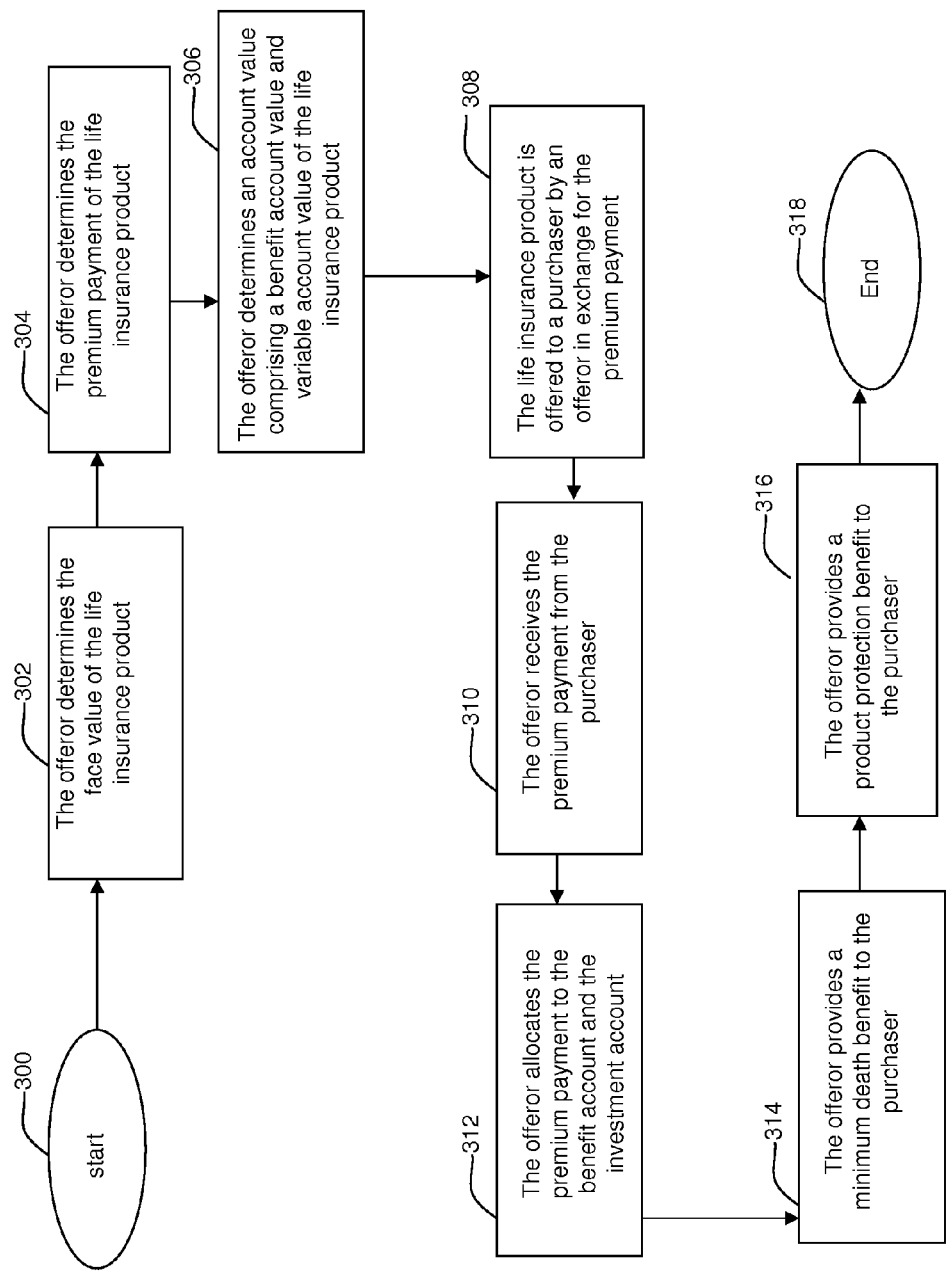
FIG. 3 is a method of constructing and offering the life insurance product in accordance with an embodiment of the present invention.

Referring now to FIG. 3, there is shown a method of constructing and offering the life insurance product 100. The method starts in step 300. Step 300 is followed by step 302 where the offeror determines the face value 102 of the life insurance product 100, and in step 302, the face value 102 may be determined by the purchaser 126 (such as by selecting an arbitrary amount of the face value 102), by the purchaser 126 selecting from a range of values, or by a computer system or program.

Step 302 is followed by step 304 where the premium payment 122 of the life insurance product 100 is determined by the offeror 124.

Next in step 306, the offeror 124 determines an account value 104 comprising a value in benefit account 116 and value in variable account 118. Step 308 follows step 306 where the offeror 124 offers to a purchaser 126 the life insurance product 100 in exchange for the premium payment 122. Next in step 310, the offeror 124 receives the premium payment 122 from the purchaser 126, and the offeror 124 allocates in step 312 the premium payment 122 to the benefit account 116 and the variable investment account 118.

Yet further, the premium payment 122 is credited to sub-accounts (such as where they are then converted into accumulation units) by dividing the amount of the premium payment 122 minus any applicable charges by the accumulation unit value for that day. As a result, increased premium payments 122 result in an increased number of owned accumulation units. The value of a sub-account is determined by multiplying the number of accumulation units (as allocated by the owner) by its current value.

The value of an accumulation unit is determined by the following formula:

$$AU_t = AU_{t-1} \times NIF$$

Where $AU_t$=value of accumulation unit on the current day;
$AU_{t-1}$=value of accumulation on the previous day;
NIF=Net Investment Factor, which is calculated by:

$$\frac{\text{Share } Value_t + \text{Capital Gains} + \text{Dividend}}{\text{Share } Value_{t-1}} \times \% \text{ Cost of Account}$$

Since the value of an accumulation unit is updated daily, the variable value can be determined at any point in time.

In accordance with the life insurance product 100 of the current invention, a purchaser 126 can elect to transfer premium payments 122 and/or account values 104 among the various account options. For example, after allocating a portion of the premium payment 122 to a plurality of sub-accounts, the purchaser 126 of the life insurance product 100 of the current invention has the option of transferring any sub-account value to any other sub-account. In the preferred embodiment, the transfer is accomplished by selling the underlying sub-account share and utilizing the proceeds to purchase a share of the underlying fund that the purchaser 126 wishes to transfer into. While any method of recording and monitoring these transfers is contemplated, in the preferred embodiment, the transfers are completed and maintained electronically.

A purchaser 126 can also transfer between a sub-account portion of the variable investment account 118 and the fixed account 121 portion of the variable investment account 118. In the preferred embodiment, the life insurance product 100 of the present invention charges a transfer fee and discourages disruptive activity, which can adversely affect the value of the variable investment account. Non-limiting examples of restrictions include allowing a purchaser to make one transfer per day and limiting the number of transfers to twenty (20) transfers per period. In the preferred embodiment of the present invention, the life insurance product 100 assesses a fee for transferring between the benefit account 116 and the variable investment account 118. Preferably, any transfer from the benefit account 116 to the variable investment account 118 reduces the face value 102 of the life insurance product 100 of the current invention.

Yet further, step 314 follows step 312, and in step 314, the offeror 124 provides a death benefit 108 to the purchaser 126. Next in step 316, the offeror 124 provides a policy protection benefit 106 to the purchaser 124 if certain conditions are met. The method ends in step 318.

Figure 4:
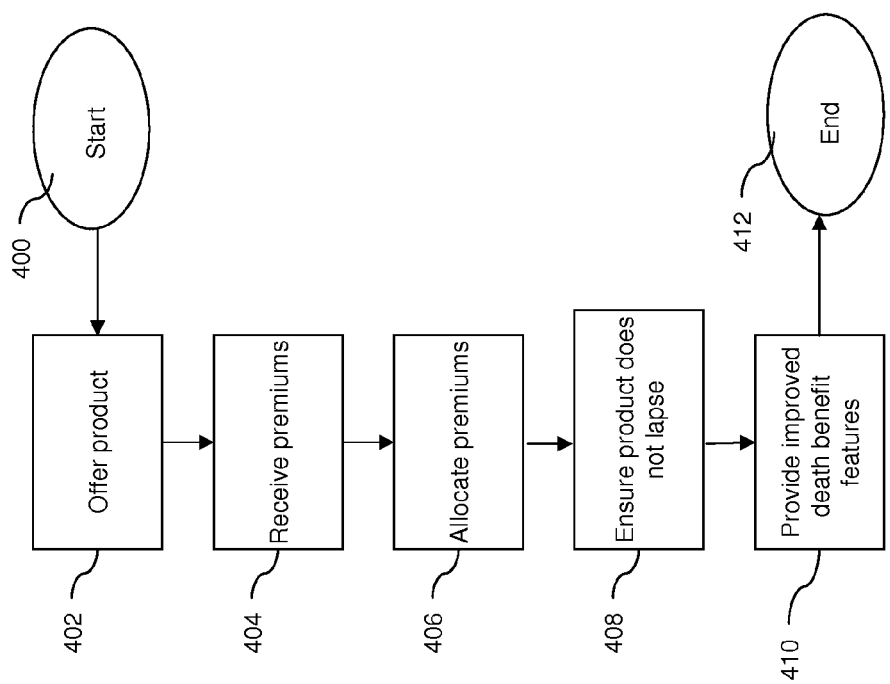
FIG. 4 is an overview of the steps taken when managing the life insurance product in accordance with an embodiment of the present invention.

FIG. 4 describes the method of managing the life insurance product 100 of the present invention. The procedure starts in step 400 where a life insurance product 100 is constructed as described above and is offered to a purchaser 126 in step 402.

In step 402, the purchaser 126 chooses a face value 102 for the life insurance product 100 in accordance with his desired level of risk, along with any optional riders 110 that the purchaser 126 wishes to include in the life insurance product.

A premium payment 122 is calculated based on the customization of the product by the purchaser 126. The purchaser 126 then provides the premium payment 122 and the offeror 124 of the life insurance product 100 receives the premium payment 122 in step 404. In response to the direction of the purchaser 126, the offeror 124 allocates the premium payments 122, in step 406, between the benefit account 116 and the variable investment account 118. The variable investment account 118 provides a variable rate of return, and because it is a variable return instrument, it is possible that returns can be negative.

The present invention ensures that the life insurance policy 100 does not lapse by providing an automatic policy protection benefit 106 in step 408. The policy protection benefit 106 is designed to prevent the life insurance product 100 from going into default. More specifically, when the policy protection benefit 111 is available, normal periodic deductions from the benefit account 116 (as described above) are waived to the extent that the deductions would exceed the value (i.e., monetary amount) in the benefit account 116. Currently, variable life insurance policies automatically lapse (i.e., default) if the periodic deductions exceed the account value. As a result, a purchaser 126 would lose all of the value associated with the variable life insurance policy.

The policy protection benefit 106 of the current invention is automatically available if the policy protection test is met, and which will be discussed below. In addition, it is contemplated that the purchaser 126 could pay additional premiums to the benefit account or transfer funds from the variable investment account.

To determine if the policy protection test is met, the current invention utilizes a policy protection account 111. The policy protection account 111 is a reference account used solely to determine whether the policy protection test has been met.

The policy protection account 111 is not utilized to determine the actual account value 104 or death benefit 108. While it is contemplated that any manner of valuing the amount in the policy protection account 111 may be utilized, in the preferred embodiment of the present invention, the policy protection account 111 is determined by the following sequence of steps:

Initially, the policy protection account 111 is equal to the sum of fund A and fund B, which are calculated as follows:

1. During the first policy year, all amounts credited to the policy protection account 111 as a result of premium payments 122 allocated to the benefit account 116 and transfers into the benefit account 116 from the variable investment account 118 and the loan account 120 (i.e., as a result of a loan repayment 206) will be credited to fund B. Thereafter, if at the time of a premium payment 122 or transfer into the benefit account 116, the value of the policy protection account 111 is zero or negative, amounts credited to the policy protection account 111 are credited to fund A. If the value is positive the payment or transfer in is credited to fund B.

2. The amount credited to the value in the policy protection account 111 as a result of a premium payment 122 is credited interest as if it was deposited as of the beginning of the policy month during which it was actually paid. Appropriate charges apply to the amount credited.

3. The amounts credited to the value in the policy protection account 111 as a result of transfers into the benefit account 116 from the variable investment account 118 are credited interest from the day they are processed on the life insurance product 100. Appropriate charges apply to the amount credited to the value in the policy protection account 111.

4. The amount credited to the value in the policy protection account 111 as a result of transfers into the benefit account 116 from the loan account 120 as a result of a loan repayment are credited interest from the day they are processed on the life insurance policy 100. No amount will be charged against the amount credited as a result of a transfer.

5. The amount credited to the value in the policy protection account 111 as a result of an adjust-up transaction applied to the benefit account 116 will be credited interest from the day they are processed on the life insurance policy 100. No amount is charged against the amount credited as a result of an adjust-up transaction.

6. If fund A is positive when a monthly deduction is calculated, the monthly deduction is based on the charges applicable to fund A. Otherwise, the monthly deduction is based on charges applicable to fund B. The charges are deducted from fund A until the value of fund A becomes zero. Remaining charges are deducted from fund B, which can have a negative value.

7. Amounts deducted from the value in the policy protection account 111 as a result of a loan 202 or withdrawals and transfers from the benefit account 116, are processed on the day the transaction is processed on the benefit account 116, and is deducted from fund A until fund A becomes zero. The remaining amount is deducted from Fund B.

8. Amounts as a result of a loan repayment 206 to the benefit account 116 are processed on the day the transaction is processed on the benefit account 116, and is deposited to fund A if the value in the policy protection account 111 is zero or negative. If the value in the policy account protection 111 is positive, the funds are deposited to fund B.

9. Interest is credited to each fund (i.e., Fund A and Fund B) at the annual effective rate applicable to that fund, which varies according to such variables as: issue age, duration, and risk class (e.g., smoker or non-smoker).

As a result of the policy protection benefit 106, the life insurance product 100 of the present invention has novel features over a traditional variable universal life insurance policy. More specifically, the life insurance product 100 of the present invention ensures that the death benefit 108 will never be less than the face value 102 of the life insurance product 100. In addition, charges incurred are only deducted from the benefit account 116 while the investment account 118 is not deducted. This feature provides an added benefit in that the returns are greater to purchaser 126. Further, the policy protection benefit 106 ensures that the account value 104 of the life insurance product 100 is never less than zero, which shields the purchaser 126 from any potentially negative values in the variable investment account 118.

Furthermore, to protect against the possibility of any adverse market forces which may affect the variable investment account 118, the offeror 124 provides a minimum death benefit as is described in step 410.

The procedure ends in step 412. It should be appreciated that the downside risk is minimized because the purchaser 126 is ensured that the purchaser 126 will receive either the face value 102 of the life insurance product 100 or a predetermined percentage of the account value 104. As a result, the present invention provides a life insurance product 100 with all of the benefits of the various types of life insurance policies while minimizing or eliminating any of the traditional deficiencies associated with these products.

Proceeds from the life insurance product 100 can be paid in any manner as is known in the art. For example, a beneficiary (who may also be a purchaser 126) may receive a lump sum. Alternatively, the beneficiary may receive fixed payments including interest until the death benefit 108 is exhausted or alternatively, payments for a fixed period (as an example, monthly payments for 30 years). Further, the beneficiary may elect to receive only interest payments generated from the death benefit 106 until the beneficiary chooses to elect the underlying death benefit amount (i.e., the death benefit 106 serves as principal to generate interest income).

In addition and in one non-limiting embodiment, the present invention allows a purchaser 126 to surrender the life insurance product 100 for a cash surrender value. Particularly, the cash surrender value is equal to the account value 104 less a surrender charge and any outstanding loan 202 (i.e., amounts) due. Furthermore, the fee for surrendering the life insurance product 100 is a function of the duration of time. As was previously shown and described, Table 3 may be utilized to determine the appropriate surrender charge associated with the investment account 118. In addition, there may be a surrender charge assessed against the value in the benefit account 116 at the time of surrender. The initial level of the surrender charge to the benefit account 116 is a based on the face value 102 of the life insurance product 100 at issue and the issue age and underwriting class of the insured/purchaser 126. The surrender charge for the benefit account 116 decreases each year after issue of the life insurance product 100 until year 20 (i.e., 20 years after issue of the life insurance product 100) when it becomes zero. Of course, any other means of determining a surrender charge can be utilized in accordance with the present invention.

Figure 5:
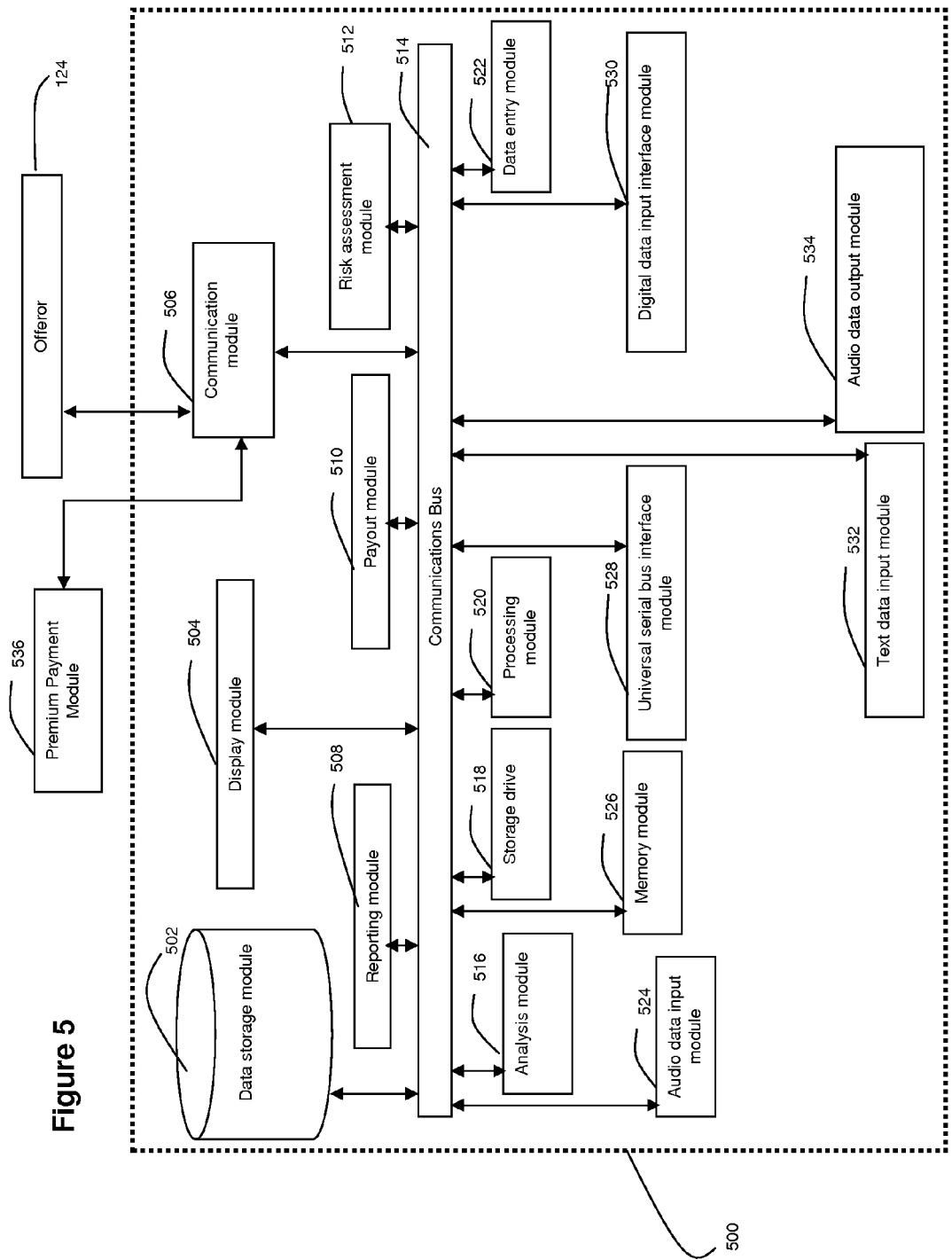
FIG. 5 describes the system on which the methods of the present invention may be implemented in accordance with an embodiment of the present invention.

FIG. 5 depicts an embodiment of a system on which the methods described above may be implemented. The present invention relates to an improved life insurance product 100, system and method, which includes at least one central processing computer or computer network server. The network server includes at least one controller or processing module 520 (CPU or processor), at least one communication module 506 port or hub, at least one random access memory module 526 (RAM), at least one read-only memory module 526 (ROM) and one or more databases or data storage modules 502. All of these latter elements are in communication with the processing module 520 to facilitate the operation of the network server.

The network server may be configured in many different ways. For example, the network server may be a conventional standalone server computer or alternatively, the function of the server may be distributed across multiple computing systems and architectures. The network server may also be configured in a distributed architecture, wherein databases and processing modules 520 are housed in separate units or locations. Some such network servers perform primary processing functions and contain at a minimum, a RAM, a ROM, and a general controller or processing module 520.

In such an embodiment, these servers are attached to a communications module 506 or port that serves as a primary communication link with other servers, clients or user computers and other related devices. The communications module 506 or port may have minimal processing capability itself, serving primarily as a communications router. A variety of communications protocols may be part of the system, including but not limited to: Ethernet, SAP, SAS™, ATP, Bluetooth, GSM and TCP/IP.

The data storage module 502 may include a hard magnetic disk drive, optical storage units, CD-ROM drives, or flash memory. The data storage module 502 contains databases used in processing transactions, and/or account value calculations in accordance with the present invention. In one embodiment, database software creates and manages these databases. Life insurance product account value, as well as premium related calculations and/or algorithms of the present invention are stored in the data storage module 502 and executed by the processing module 520.

The processing module 520 may comprise a processor, such as, in one non-limiting embodiment, one or more conventional microprocessors and possibly one or more supplementary co-processors such as math co-processors. The processing module 506 is in communication with a communication module 506 through which the processor communicates with other devices such as other servers, user terminals or devices.

The communication module 506 may include multiple communication channels for simultaneous communication with, for example, other processing module 506, servers or client terminals. As stated, devices in communication with each other need not be continually transmitting to each other. On the contrary, such devices need only transmit to each other as necessary, may actually refrain from exchanging data most of the time and may require several steps to be performed to establish a communication link between the devices.

The processing module 520 also is in communication with a data storage module 502. The data storage module 502 may comprise an appropriate combination of magnetic, optical and/or semiconductor memory, and may include, for example, RAM, ROM, flash drive, an optical disc such as a compact disc and/or a hard disk or drive. The processing module 520 and the data storage module 502 each may be, for example, located entirely within a single computer or other computing device; or connected to each other by a communication medium, such as a USB port, serial port cable, a coaxial cable, an Ethernet type cable, a telephone line, a radio frequency transceiver or other similar wireless or wireline medium or combination of the foregoing.

The data storage module 502 may store, for example, a program (such as a computer program code and/or a computer program product) adapted to direct the processing module 520 in accordance with the present invention, and particularly in accordance with the processes described in detail hereinafter with regard to the processing module 520; and a database adapted to store information that may be utilized to store information required by the program. The data storage module 502 includes multiple records, with each record comprising fields that are specific to the present invention such as face value 102, account value 104, benefit account 116, variable investment account 118, loan account 120, etc. The program may be stored, for example, in a compressed, an uncompiled and/or an encrypted format, and may include computer program code. The instructions of the program may be read into a main memory of the processing module 520 from a computer-readable medium other than the data storage module 502, such as from a ROM or from a RAM. While execution of sequences of instructions in the program causes the processing module 520 to perform the process steps described herein, hard-wired circuitry may be used in place of, or in combination with, software instructions for implementation of the processes of the present invention. Thus, embodiments of the present invention are not limited to any specific combination of hardware and software.

Suitable computer program code may be provided for performing numerous functions such as constructing a life insurance product having a premium payment and offered by an offeror to a purchaser, and determining values related to the life insurance product 100. The functions described above are merely exemplary and should not be considered exhaustive of the type of function that may be performed by the computer program code of the present inventions.

The computer program code required to implement the above functions (and the other functions described herein) can be developed by a person of ordinary skill in the art, and is not described in detail herein.

In the preferred embodiment, all of the modules described herein are operably inter-connected via a central communications bus 514. The communications bus 514 is able to receive information from each of the modules, as well as to transmit information from one module to another. The system 500 further includes a display module 504, and a reporting module 508.

The system 500 includes a premium payment module 536 for receiving premium payments 122 submitted by the purchaser 126 (i.e., by the insured). The system 500 additionally includes a payout module 510 for making payments of benefits according to life insurance product 100 of the present invention.

The system further comprises a risk assessment module 512 for assessing the risks associated with offering the life insurance product 100 of the present invention to a purchaser 126. Furthermore, the system comprises an analysis module 516 for analysis of insurance related behavior of a given purchaser.

Additionally, the system 500 includes: a storage drive 518 for receiving data stored on a storage disc, a processing module 520 for processing digital data received by and contained in the system 500, a communication module 506 for bi-directional communication with external and telecommunications systems, a data storage module 502 for storing and managing digital information, a text data entry module 532 for inputting data in the form of text, and a data entry module 522 for converting documents and images to digital format and inputting them into the system 500.

Finally, the system 500 includes: an audio data input module 524 for receiving and inputting audio information, an audio data output module 534 for outputting data in audio format (i.e. recorded speech, synthetically generated speech from digital text, etc), a memory module 526 for temporarily storing information as it is being processed by the processing module 520, a universal serial bus interface module 528 for receiving and transmitting data to and from devices capable of establishing a universal serial bus connection, and a digital data input interface module 530 for receiving data contained in external digital storage devices.

The term "computer-readable medium" as used herein refers to any medium that provides or participates in providing instructions to the processor of the computing device (or any other processor of a device described herein) for execution. Such a medium may take many forms, including but not limited to, non-volatile media, volatile media, and transmission media. Non-volatile media include, for example, optical or magnetic disks, such as memory. Volatile media include dynamic random access memory (DRAM), which typically constitutes the main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM or EEPROM (electronically erasable programmable read-only memory), a FLASH-EEPROM, any other memory chip or cartridge, a carrier wave as described hereinafter, or any other medium from which a computer can read.

Various forms of computer readable media may be involved in carrying one or more sequences of one or more instructions to the processor (or any other processor of a device described herein) for execution. For example, the instructions may initially be borne on a magnetic disk of a remote computer. The remote computer can load the instructions into its dynamic memory and send the instructions over an Ethernet connection, cable line, or even telephone line using a modem. A communications module 506 local to a computing device (or, e.g. a server) can receive the data on the respective communications line and place the data on a system bus for the processing module 520. The system bus carries the data to the memory module 526, from which the processing module 520 retrieves and executes the instructions. The instructions received by the memory module 526 may optionally be stored in memory either before or after execution by the processing module 520. In addition, instructions may be received via a communication module 506 as electrical, electromagnetic or optical signals, which are exemplary forms of wireless communications or data streams that carry various types of information.

Servers of the present invention may also interact and/or control one or more user devices or terminals. The user device or terminal may include any one or a combination of a personal computer, a mouse, a keyboard, a computer display, a touch screen, an LCD, voice recognition software, or any other device generally represented by input/output devices required to implement the above functionality. The program also may include program elements such as an operating system, a database management system and "device drivers" that allow the processing module 520 to interface with computer peripheral devices (e.g. a video display, a keyboard, a computer mouse, etc).

It should be understood that the user may communicate with the computing system directly or indirectly through another party. In the event the user communicates with another party, the other party receives and transfers information, to and from the system 500 via the text data input module 532, audio data input module 524, audio data output module 534 and the display module 504. As used herein the data storage module 502 is also referred to as a storage device. The processing module 520 is contained within the system 500, which is coupled to the data storage module 502, the data storage module 502 stores instructions that are utilized by the processor.

While the present invention has been described with reference to one or more preferred and alternate embodiments, such embodiments are merely exemplary and are not intended to be limiting or represent an exhaustive enumeration of all aspects of the invention. Further, it will be apparent to those of skill in the art that numerous changes may be made in such details without departing from the spirit and the principles of the invention. It should be appreciated that the present invention is capable of being embodied in other forms without departing from its essential characteristics.

What is claimed is:

1. A computer system for processing data relating to a life insurance policy issued by an insurance company to an owner, comprising:
   a data storage device storing data relating to the life insurance policy, including data indicative of a face amount, a benefit account, an investment account and a death benefit factor;
   a processor in communication with the data storage device, the processor configured to:
   access data indicative of the face amount, a value of the investment account, a value of the benefit account and a value of the death benefit factor;
   determine a first value based on a sum of the face amount and the value of the investment account;
   determine a second value based on the benefit account value, the investment account value and the value of the death benefit factor; and
   determine an amount of a death benefit of the life insurance policy to be the greater of the first value and the second value;
   provide output data indicative of the death benefit amount; and
   a communications device in communication with the processor, the communications device configured to receive from the processor data indicative of the death benefit amount and to communicate the received data via a network.

2. The computer system of claim 1, wherein the processor is configured to determine the first value to be equal to the sum of the face amount and the value of the investment account.

3. The computer system of claim 1, wherein the data indicative of the value of the death benefit factor comprises data indicative of the value of the death benefit factor being a predetermined percentage between 100% and 1400%, inclusive.

4. The computer system of claim 3, wherein the data indicative of the value of the death benefit factor comprises data indicative of the value of the death benefit factor being a predetermined percentage of 250%.

5. The computer system of claim 1, wherein the data storage device further stores data relating to a balance of a loan account of the insurance policy, and the processor is configured to determine the second value based further on the loan account balance.

6. The computer system of claim 1, wherein the data storage device further stores data indicative of a premium amount and data received via the communications device and indicative of owner instructions for an allocation of the premium amount between the benefit account and the investment account.

7. The computer system of claim 1, wherein the processor is configured to deduct periodic charges from the benefit account.

8. The computer system of claim 7, wherein:
the data storage device further stores data indicative of a policy protection account and data indicative of a policy protection benefit; and
the processor is further configured to:
determine the value of the policy protection account and compare the value of the policy protection account to a threshold value;
responsive to determining that the value of the policy protection account is at least the threshold value, provide output data indicative that the policy protection account is applicable, and that in accordance with the policy protection benefit, the policy will not lapse as a result of the periodic charges; and
responsive to determining that the value of the policy protection account is below the threshold value, provide output data indicative that the policy protection benefit is not applicable.

9. The computer system of claim 8, wherein the processor is further configured to determine the value of the policy protection account by crediting the policy protection account based on an allocation of premium to the benefit account.

10. The computer system of claim 9, wherein the processor is further configured to transfer funds from the investment account to the benefit account responsive to receipt of data, via the communications device, indicative of owner instructions to transfer funds, and to credit the policy protection account based on the transfer of funds to the benefit account.

11. The computer system of claim 1, further comprising a payout module in communication with the processor, the payout module configured to effect payments of benefits to a beneficiary of the life insurance policy.

12. The computer system of claim 1, wherein the data indicative of the value of the death benefit factor comprises data indicative of the value of the death benefit factor being one of a predetermined percentage or a multiplier.

13. A computer-implemented method for processing data relating to a life insurance policy issued to a policy owner, comprising:
storing by a data storage device data relating to the life insurance policy, including data indicative of a face amount, a benefit account, an investment account and a death benefit factor;
accessing by a processor from the data storage device data indicative of the face amount, a value of the investment account, a value of the benefit account, and a value of the death benefit factor;
determining by the processor a first value based on a sum of the face amount and the value of the investment account;
determining by the processor a second value based on the benefit account value, the investment account value and the value of the death benefit factor;
determining by the processor a death benefit of the life insurance policy to be the greater of the first value and the second value;
providing by the processor output data indicative of the determined death benefit amount; and
receiving by a communications device from the processor the data indicative of the determined death benefit amount and communicating by the communications device the received data via a network.

14. The computer-implemented method of claim 13, further comprising receiving by the communications device data indicative of a premium amount and an owner allocation of the premium amount between the benefit account and the investment account.

15. The computer-implemented method of claim 14, further comprising receiving by the communications device data indicative of owner instructions to transfer funds between the benefit account and the investment account.

16. The computer-implemented method of claim 13, further comprising paying by a payout module the determined benefit amount to a beneficiary.

17. The computer-implemented method of claim 13, further comprising accessing by the processor from the data storage device data indicative of a value of a loan account of the life insurance policy, and determining by the processor the second value based on the loan account value.

18. A non-transitory computer-readable storage medium having processor-executable instructions stored thereon, the instructions, when executed by a processor, causing the processor to:
access data stored in a data storage device, the stored data relating to a life insurance policy and including data indicative of a face amount, a value of an investment account, a value of a benefit account, and a value of a death benefit factor;
determine a first value based on a sum of the face amount and the value of the investment account;
determine a second value based on the benefit account value, the investment account value and the value of death benefit factor;
determine a death benefit of the life insurance policy to be the greater of the first value and the second value; and
providing by the processor output data indicative of the determined death benefit amount.

19. The non-transitory computer-readable storage medium of claim 18, wherein the instructions further cause the processor to access data indicative of a value of a loan account of the life insurance policy, and to determine the second value by determining a sum of the benefit account value, the investment account value and the loan account value, and multiplying the determined sum by the value of the death benefit factor.

20. The non-transitory computer-readable storage medium of claim 18, wherein the instructions further cause the processor to receive via a communications device data indicative of owner instructions for an allocation of a value of the investment account among a plurality of sub-accounts of the investment accounts, and to provide data indicative of instructions for the allocation among the sub-accounts in accordance with the owner instructions.

21. The non-transitory computer-readable storage medium of claim 18, wherein the instructions further cause the processor to receive via a communications device data indicative of a premium amount and owner instructions for allocation of the premium amount between the benefit account and the investment account, and to provide data indicative of instructions for the allocation between the benefit account and the investment account in accordance with the owner instructions.

* * * * *